AIR-BORNE COMMUNICATION AND SHELTER APPARATUS

Filed Nov. 13, 1951 2 Sheets-Sheet 1

INVENTOR
HARRY A. TOULMIN JR
BY Toulmin & Toulmin
ATTORNEYS

AIR-BORNE COMMUNICATION AND SHELTER APPARATUS

Filed Nov. 13, 1951 2 Sheets-Sheet 2

INVENTOR
HARRY A. TOULMIN JR
BY Toulmin & Toulmin
ATTORNEYS

Patented Mar. 9, 1954

2,671,623

UNITED STATES PATENT OFFICE 2,671,623

AIR-BORNE COMMUNICATION AND SHELTER APPARATUS

Harry A. Toulmin, Jr., Dayton, Ohio, assignor to The Commonwealth Engineering Company of Ohio, Dayton, Ohio, a corporation of Ohio Application November 13, 1951, Serial No. 256,041

12 Claims. (Cl. 244—138)

This invention relates to airborne emergency equipment and more particularly to a portable carrier comprising a thermoelectric generator which is adapted to be stored therein along with radio transmitting and receiving equipment, ammunition, food, etc., and dropped by parachute from an airplane. The carrier is of rugged construction so that it will protect the equipment and withstand the stresses encountered when the carrier falls on the ground or into a body of water.

While various types of apparatus and equipment have been designed for aerial delivery heretofore, no one insofar as known has provided an airborne carrier comprising a thermoelectric generator, and such as would be capable of generating sufficient electrical energy to operate radio transmitting and receiving equipment. This is the principal object of the present invention.

Another important object of the invention is to provide a packaged thermoelectric generator and auxiliary equipment which is capable of being dropped from an airplane by means of a parachute to land or sea personnel.

Another object of the invention is to provide an airborne carrier which is substantially waterproof and adapted to carry a thermoelectric generator and radio transmitting and receiving equipment which is operable by the generator, the carrier comprising a laminated metal box which is equipped with eye bolts for attachment of a parachute.

A further object of the invention is to provide airborne thermoelectric generator equipment which may be utilized by the Army, Air and Naval forces for airborne delivery to any desired location, and wherein the thermoelectric generator may be readily assembled after delivery of the carrier and operated to provide a source of light and heat, and also to generate sufficient electrical power to operate a radio transmitter or receiver.

A further object is to provide an airborne carrier in which is mounted a thermoelectric generator, and wherein the carrier comprises aircraft signaling flares, maps, first aid equipment, fishing tackle, ammunition, guns, rations and such as to make up a complete survival unit.

Still another object of the invention is to provide an airborne carrier for a thermoelectric generator whereby the same may be delivered by air on land or sea and which is operable to provide heat, light and electricity, the carrier or box being utilized to shelter the generator during its operation and to enclose or expose the lighted burner for signal purposes.

These and other objects and advantages will become apparent during the course of the following description.

In the accompanying drawings which form a part of this specification and in which like numerals are employed to designate the like parts throughout the same, Figure 1 is a view in perspective of the airborne package equipment illustrating the mounting of the thermoelectric generator and heating mechanism therefor, the carrier or strong box therefor being shown in open position and parts of the generator being cut away to illustrate the construction more clearly.

Figures 1, 2:
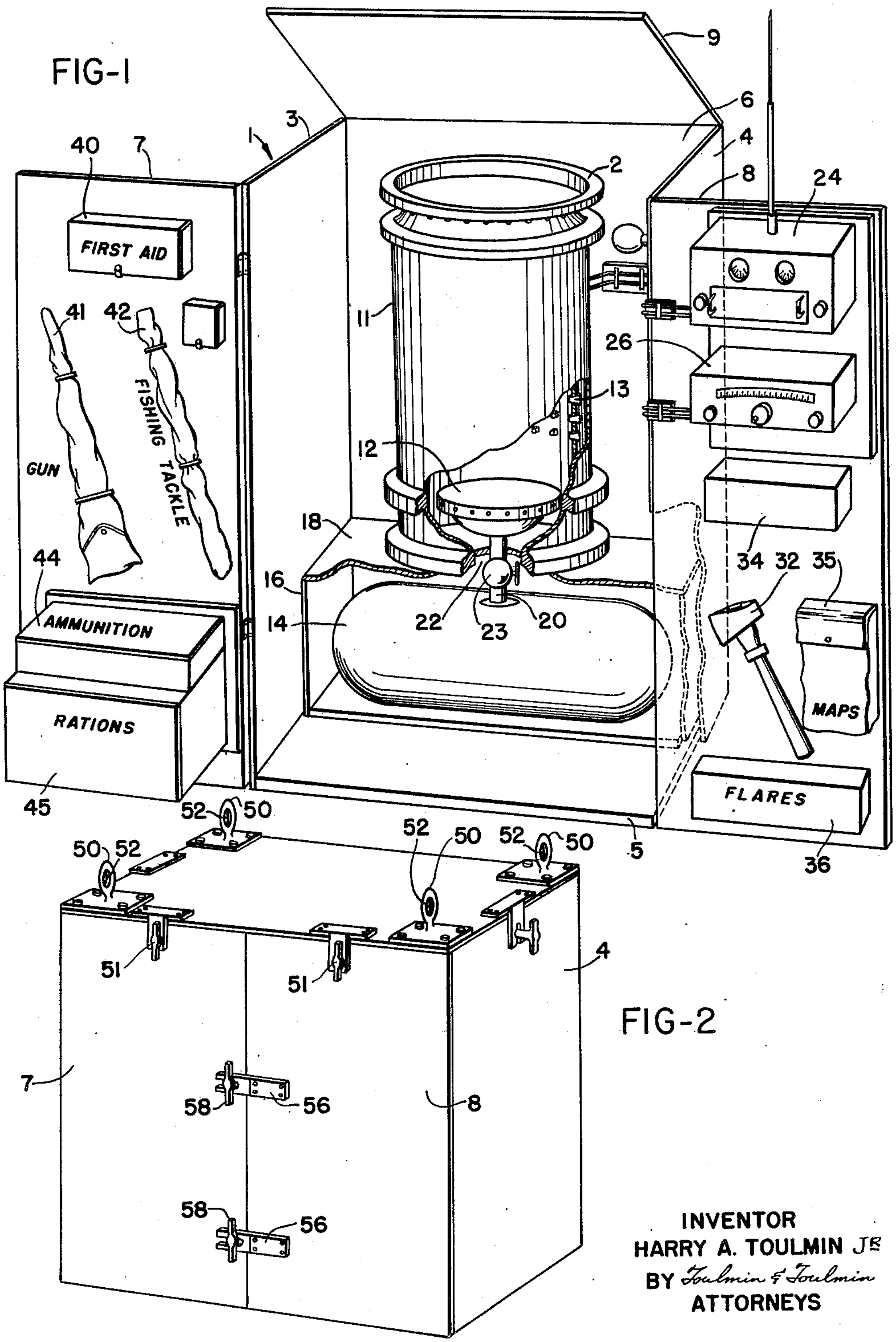
Figure 2 is a perspective view of the carrier for holding the thermoelectric generator and auxiliary equipment, the carrier being shown in its closed position.

Referring now more particularly to the drawings, in Figure 1 the carrier indicated generally at 1, in which is mounted the thermoelectric generator 2, is in the shape of a rectangular box having side panels 3 and 4, and a bottom panel 5 and a rear panel 6. At the front the carrier is equipped with outwardly swinging panels 7 and 8 which are hingedly secured at their edges to the adjacent side panels 3 and 4, respectively. A top closure panel 9 which is provided is likewise hinged along its rear edge and attached to the top of the panel 6. This construction enables the carrier to be opened so as to gain full access to the interior, the side and top panels also serving as a windbreak. Further, by raising and lowering the top closure panel 9, while the thermoelectric generator is in operation and supplying light, signals may be transmitted to aircraft over head.

The carrier 1 may be made of any suitable material which is sturdy enough to withstand the shock of landing and afford sufficient protection for the equipment. For this purpose the carrier may be fabricated from light metal such as aluminum or magnesium, or any alloy thereof. Plywood may also be used as well as other metals such as steel, or alloys thereof, although a lighter metal is preferred in order to conserve weight.

The thermoelectric generator 2 mounted in the carrier 1, as shown, may be of conventional construction and such as will generate sufficient electrical power to operate radio equipment. A thermoelectric generator suitable for this purpose is that described in the patent to Paul L. Dulaney, 2,253,771. Further, where it is desired to provide a relatively constant terminal voltage and prevent fluctuations and undesirable increases of the current delivered by this type of generator, a thermoelectric generator arrangement such as illustrated in the patent to H. J. Findley, 2,480,405, may be employed.

In the thermoelectric equipment shown in Figure 1, the generator is in the shape of a drum 11 open at the top and arranged to be heated by a burner 12 which is suitably positioned in the bottom portion of the drum and such as to supply heat to the thermopiles 13. Gaseous fuel is supplied to the burner 12 from a supply tank or carboy 14 which is adapted to contain fuel gas, such as propane or the like. The thermoelectric generator is supported on a rectangular base 16 which is arranged in the bottom of the carrier, as illustrated in Figure 1. The tank 14 for containing the bottled gas is suitably positioned beneath the floor 18 which functions as a support for the generator, a pipe 20 being inserted through an opening 22 in the base 18 for connection to the burner 12.

A valve 23 is located in the line 20 which may be operated to control the gas admitted to the burner 12. Further, if desired, a pilot light not shown, may be connected to the gas supply and arranged to provide for automatic lighting of the burner upon opening of the valve 23. The burner may also be lighted prior to releasing the emergency equipment for parachute delivery so as to start the thermoelectric generator in operation before being airborne to earth.

Additional equipment, including a radio transmitter 24 and receiving apparatus 26, is affixed to the side door panel 8, as illustrated in Figure 1. Additional equipment, such as an axe 32, tool box 34, compartment 35 for maps, and a box 36 for storing flares, etc., are suitably secured to the door panel, and arranged to fit snugly in the carrier when the panels are swung to their closed position.

Similarly, one the adjacent panel 7, equipment such as first aid means 40, a gun 41, fishing tackle 42, ammunition 44 and a box 45 for containing rations is suitably mounted as by means of screws to this panel.

Figures 3, 4:
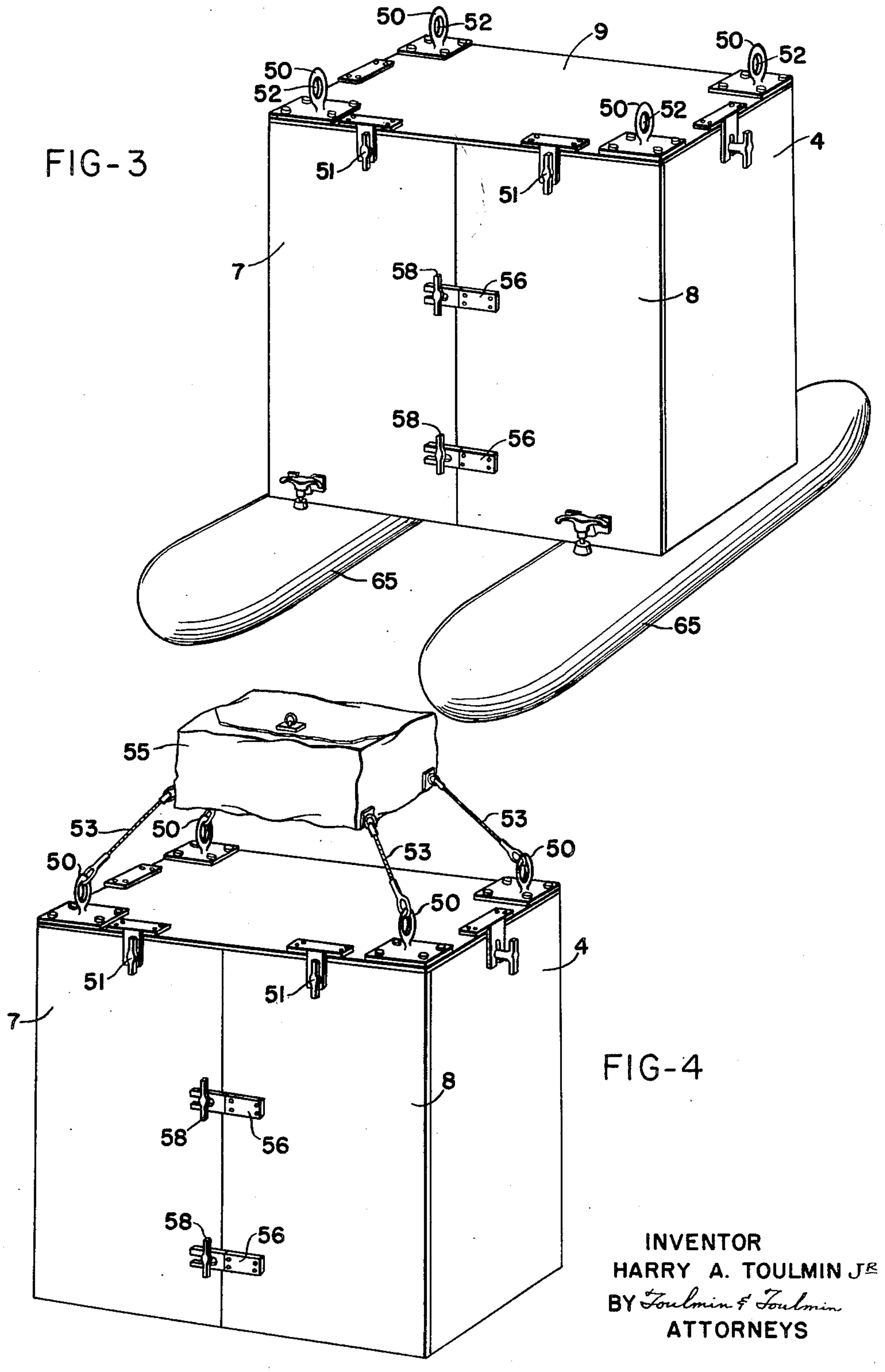
Figure 3 is a view showing a modification wherein the carrier is equipped with pontoons for delivery of the packaged equipment onto the surface of water.
Figure 4 is a view similar to Figure 2 and illustrates the parachute attachment for delivery of the equipment.

The carrier in which is mounted the thermoelectric generator, ratio and additional emergency equipment is constructed so as to provide a compact, sturdy container, and wherein the hinged panels may be securely fastened but may be easily opened without the need of any tools. To secure the swinging panels of the carrier together and form a compact, strong box or package, which may be dropped from an airplane by parachute, the top panel 9 of the carrier is provided with brackets 50 which are attached to each corner of the top panel. The panel 9 is likewise securely bolted to the adjacent side panels by suitable angle straps 51, as illustrated in Figure 2. The brackets 50 comprise eyelets 52 to which are attached the cable 53 of a parachute 55 as shown in Figure 4. The hinged side panels and top panels are securely held together by means of strap bolts 56. Winged nuts 58 are provided to secure the bolts, making it relatively easy to open the carrier without the need of special tools.

During use the packaged carrier equipment containing the thermoelectric generator and auxiliary paraphernalia is attached to the parachute and dropped from an airplane so that the carrier and equipment is airborne to the desired location.

Where the packaged equipment is to be dropped into a body of water the carrier is provided with pontoons 65 which are suitably attached to the bottom of the carrier as shown in Figure 3. The carrier is also preferably provided with a waterproof sealing liner, such as heavy tar paper, asphalt sheet, plastics, e. g., rubber and/or regenerated cellulose which may be suitably arranged within the carrier and about the equipment to waterproof the same.

To ignite the gas burner when it is desired to operate the thermogenerator, use may be made of flint or the like for supplying a hot spark. The sparking means may be suitably actuated upon turning on the valve 23, admitting bottled gas from the pressure tank 14 to the burner 12, or such ignition means may be included as a separate piece of equipment.

Where it is desired to utilize the invention to continuously receive or transmit radio signals, the burner of the thermoelectric generator is lighted to supply electrical energy and the radio mechanism connected thereto adjusted to cause radio signals to be received or continuously broadcast as desired. The invention accordingly, may be operated to automatically radio its location or signal the location of disabled aircraft merely by making the appropriate connections to the radio transmitter and starting the thermoelectric generator before releasing the carrier from the plane.

In a modified form of the carrier, an inflatable raft may be suitably attached to the bottom portion of the carrier so that upon inflation the carrier may be floated on top of a body of water in amphibious operations, as when rescuing personnel at sea. Inflation of the raft is preferably triggered to operate when the carrier falls into the sea. The carrier may also be painted a brilliant color, such as yellow, whereby it can be readily spotted when dropped into the sea or underbrush.

The packaged airborne carrier described not only may be utilized to generate electrical energy but the bottled gas burner equipment may be used to warm personnel and cook food if desired, and provide a source of light.

The invention provides a carrier having a built-in or self-contained thermoelectric generator and radio transmitting and receving equipment and which when closed and ready for transportation forms a compact, sturdy package for airborne delivery anywhere on land or sea.

While the invention has been illustrated in some detail and described, it should be understood that the invention is not to be limited to the precise details of construction and use described, but may be modified and carried out in other ways within the scope of the invention as set forth in the appended claims.

I claim as my invention:

1. An aerial delivery carrier comprising a container having wall portions, means for detachably fastening said wall portions together to form a strong, rugged package for aerial delivery, said carrier including means for aerial delivery by a parachute, said carrier having attached to its inner wall portions a thermoelectric generator and radio transmitting and receiving means, one of said wall portions being pivotally mounted over said generator said radio means electrically connected to said thermoelectric generator and adapted to be operated by electrical power supplied by said generator.

2. In an aerial delivery carrier unit comprising a container, a parachute attached to said container, means comprising a thermoelectric generator and burner arranged for heating said generator, a tank containing gaseous fuel operatively connected to said burner for supplying fuel thereto, said thermoelectric generator unit being attached to the inner wall of said container carrier so as to provide a unitary structure, said container carrier comprising panels which are movable to gain access to the interior of said carrier and said generator and radio apparatus connected to said generator.

3. An aerial delivery unit including a carrier containing a thermoelectric generator and radio communication equipment and a burner for energizing said generator, said carrier comprising a rectangular shaped container having top, side and bottom walls, said top wall being pivotally secured by hand operable bolt means to the adjacent side walls of said container and comprising means for emitting light signals from said burner, said container being formed of laminated panels which are secured together to form a substantially water-proof container.

4. In an aerial delivery carrier unit, the combination of a thermoelectric generator and means comprising bottled gas and a burner connected thereto for supplying heat to said electrical generator, said thermoelectric generator being arranged to supply light and heat, said carrier including means for aerial delivery by a parachute.

5. An aerial delivery carrier comprising a self-contained unit including in combination a thermoelectric generator for producing light, and heat and electricity, said thermoelectric generator being mounted in a protective casing, and means for emitting said light and heat comprising swingable panels on said casing means.

6. An aerial delivery carrier comprising a thermoelectric generator for producing electric current, light and heat, means comprising a burner and fuel supply connected thereto for heating said thermoelectric generator, said generator and associated burner and fuel supply means being mounted in a protective casing which provides a windbreaker and shelter for the user said casing having parachute means attached thereto, radio communication apparatus connected to said generator and mounted within said casing, said casing comprising swingable panels for emitting said light and heat.

7. An aerial delivery carrier unit comprising a container having top and side walls, means for generating light, heat and electricity mounted within said container, said top wall being pivotally mounted above said generating means, and means for securing a parachute to said top wall.

8. The combination of claim 1 including radio communication means connected to said generating means.

9. The combination of claim 1 wherein said generating means includes a thermoelectric generator and burner means for said generator.

10. The combination of claim 1 wherein said side walls are pivotally attached to said container.

11. The combination of claim 6 wherein pontoon means are provided on said casing for floating the same on the surface of the water.

12. An aerial delivery carrier comprising as a self-contained unit a container having wall portions swingably secured together, said unit including in combination a thermoelectric generator for producing light, heat and electricity, and radio receiving and transmitting means operatively connected to said generator, said generator and auxiliary radio equipment being detachably secured to the inner wall portions of said carrier.

HARRY A. TOULMIN, Jr.

References Cited in the file of this patent

UNITED STATES PATENTS

| Number | Name | Date |
|---|---|---|
| 869,156 | Barry | Oct. 22, 1907 |
| 1,249,439 | McCoy | Dec. 11, 1917 |
| 1,521,650 | Rudolph | Jan. 6, 1925 |
| 1,760,061 | Horni | May 27, 1930 |
| 1,920,193 | Gary | Aug. 1, 1933 |
| 2,253,771 | Dulaney | Aug. 26, 1941 |
| 2,347,205 | Linksey | Apr. 25, 1944 |
| 2,480,405 | Findley | Aug. 30, 1949 |
| 2,510,843 | Townshend | June 6, 1950 |
| 2,519,553 | Faulkner | Aug. 22, 1950 |
| 2,565,523 | Russell | Aug. 28, 1951 |

FOREIGN PATENTS

| Number | Country | Date |
|---|---|---|
| 596,992 | Great Britain | Jan. 15, 1948 |